(12) United States Patent
De Coulon et al.

(10) Patent No.: US 10,900,929 B2
(45) Date of Patent: Jan. 26, 2021

(54) PH VALUE MEASURING DEVICE COMPRISING IN SITU CALIBRATION MEANS

(71) Applicant: VEOLIA WATER SOLUTIONS & TECHNOLOGIES SUPPORT, Saint-Maurice (FR)

(72) Inventors: Yves De Coulon, Thielle-Wavre (CH); Carine Beriet, Peseux (CH); Cyrille Lemoine, Sartrouville (FR)

(73) Assignee: Veolia EAU—Compagnie Generale Des Eaux, Nanterre (FR)

( * ) Notice: Subject to any disclaimer, the term of this patent is extended or adjusted under 35 U.S.C. 154(b) by 79 days.

(21) Appl. No.: 16/030,086

(22) Filed: Jul. 9, 2018

(65) Prior Publication Data

US 2020/0011830 A1    Jan. 9, 2020

Related U.S. Application Data

(62) Division of application No. 14/763,252, filed as application No. PCT/EP2014/051454 on Jan. 24, 2014, now abandoned.

(30) Foreign Application Priority Data

Jan. 25, 2013 (FR) .................................. 13 50666

(51) Int. Cl.
*G01N 27/416* (2006.01)
*G01N 27/30* (2006.01)
*G01N 27/414* (2006.01)

(52) U.S. Cl.
CPC ....... *G01N 27/4165* (2013.01); *G01N 27/302* (2013.01); *G01N 27/414* (2013.01)

(58) Field of Classification Search
None
See application file for complete search history.

(56) References Cited

U.S. PATENT DOCUMENTS

| | | | | |
|---|---|---|---|---|
| 4,961,163 A | * | 10/1990 | Bryan ................ | G01N 27/4167 204/401 |
| 5,016,201 A | * | 5/1991 | Bryan ................ | G01N 27/4167 204/401 |
| 5,911,873 A | * | 6/1999 | McCarron .......... | G01N 27/4148 204/401 |

FOREIGN PATENT DOCUMENTS

DE            4207355      *   9/1993        G01N 27/416

OTHER PUBLICATIONS

Van der Schoot et al. (Sensors and Actuators B, 105, 88-95) (Year: 2005).*
Bier (Electrochemistry Theory and Practice (Year: 2010).*

* cited by examiner

*Primary Examiner* — Gurpreet Kaur
(74) *Attorney, Agent, or Firm* — Coats and Bennett PLLC

(57) ABSTRACT

The invention concerns a device for measuring the pH of an effluent, said device comprising means for measuring an item of information representative of the pH of said effluent intended to be brought into contact with said effluent. According to the invention, such a device further comprises means for modifying the pH value of said effluent close to said means for measuring.

7 Claims, 4 Drawing Sheets

PH VALUE MEASURING DEVICE COMPRISING IN SITU CALIBRATION MEANS

This application is a divisional of U.S. patent application Ser. No. 14/763,252 filed Jan. 24, 2015, which is a U.S. National Stage Application of PCT Application No. PCT/EP2014/051454, which has an international filing date of 24 Jan. 2014. Applicant claims priority based on French Patent Application No. 1350666 filed 25 Jan. 2013. The subject matter of these applications is incorporated herein.

1. FIELD OF THE INVENTION

The field of the invention is that of techniques for measuring the value of the pH of a liquid effluent.

More specifically, the invention pertains to the designing and manufacture of probes and to a method for the continuous measurement of the value of the pH of a liquid effluent.

2. PRIOR ART

Potential hydrogen, more commonly called pH, represents the chemical activity of hydrogen ions in solution. The value of the pH of a solution reveals its acidity or its basicity.

The pH is a parameter used in many applications.

The pH is for example used in water treatment where it is an indicator, for example of the healthy biological condition of water. It is also often used as a control parameter when implementing water treatment methods.

The pH is also often used in microbiology since its value governs enzyme reactions and the growth of bacteria.

The pH is also used in the pharmaceutical and medical fields since minute variations in pH can be symptomatic of serious metabolic disturbances.

There are numerous techniques for measuring the value of the pH of a solution. Among these there are especially:
  pH paper whose color varies when it is put into contact with a solution according to the pH value of this solution;
  glass electrode probes;
  non-glass electrode probes.

Only glass electrode probes or non-glass electrode probes are suited to carrying out a continuous measurement of the pH of a solution.

Glass electrode probes are relatively brittle and require daily or weekly maintenance operations, especially because the glass electrode contains an electrolyte, which is a consumable. This drawback can be reduced through the use of electrolyte in the form of gel but cannot be completely removed. Besides, the storage of glass electrodes implies compliance with special and constraining conditions. Indeed, glass electrodes have to be stored in a potassium chloride solution since dry storage induces premature ageing.

Non-glass electrode probes have especially been developed in order to overcome these drawbacks.

The invention relates more particularly but not exclusively to non-glass electrode pH measuring probes.

As can be seen in FIG. 1, non-glass electrode pH measuring probes classically comprise an ISFET (Ion-Sensitive Field Effect Transistor) type transistor and a reference electrode 15.

The ISFET transistor comprises a substrate 10 generally made of silicon on which are placed a doped source 11, a doped drain 12 and a gate 13 separated from the source 11 and the drain 12 by an insulator 14.

The gate 13 has a layer sensitive to variations in $H^+$ ion concentration.

In some variants, the reference electrode 15 can be constituted by a MOSFET (Metal Oxide Semiconductor Field Effect Transistor) type transistor.

The layer that is sensitive to variations in the $H^+$ ion concentration as well as the reference electrode 15 are to be placed in contact with the solution E, the pH of which is to be measured.

The source 11 and the drain 12 are connected to a generator 16 of electric voltage and electric current capable of generating a voltage and an electric current of constant values at their terminals.

The reference electrode 15 and the source 11 are connected to a means, such as a voltmeter, for measuring a so-called control voltage 17. This voltmeter is capable of measuring a voltage at their terminals. Inasmuch as the reference electrode is connected to the contact of the gate, the voltage measured by the voltmeter is a voltage $V_{GS}$ of the ISFET transistor across the gate and the source.

In order to measure the pH of a solution, it is put into contact with the gate 13 and the reference electrode 15.

The current generator and the voltage generator 16 are used to generate the passage of a constant current and a constant electric voltage between the source 11 and the drain 12. The values of this voltage and of this current are stable and high enough to enable the transistor to be biased.

The variation in the pH of the solution to be analyzed induces the variation of its electrochemical potential which modifies the voltage $V_{GS}$ of the transistor. The gate-source voltage $V_{GS}$ varies linearly according to the pH for a drain-source current $I_{DS}$ and a drain-source voltage $V_{DS}$ that are constant. The voltage $V_{GS}$, called a control voltage, is then measured at the terminals of the reference electrode 15 and the source 11. The measurement of this voltage therefore enables the value of the pH of the solution to be determined.

As compared with glass electrode probes, ISFET electrode probes are more resistant, easier to store since they can be stored in a dry state, more precise and faster because they have a very short response time.

ISFET electrode probes and more generally probes for measuring pH can however be further improved.

3. DRAWBACKS OF THE PRIOR ART

The main drawback of ISFET electrode probes is related to the fact that a drift is observed over time between the measured value of the pH and its real value. This drift dictates the regular recalibration of the probe.

In order to ensure that the measurement of the pH by the probe represents reality, the frequency of the recalibration is generally daily.

The linear function relating the pH to the voltage $V_{GS}$ measured by the ISFET probe is:

$$V_{GS} = C_2 \cdot pH + E^0$$

where $C_2$ (the slope) and $E^0$ (the intercept point) are constants.

In the recalibration phases, the probe is dismounted so as to be placed alternately in solutions having pH values that are known and different from one another. The comparison of the pH values measured by the probe with the real values then allows to correct the value of the slope and/or the intercept point of the pH curve of the probe in such a way that the pH value measured with the probe is identical to the real value of the pH of the solution analyzed.

These recalibrations therefore require qualified workers, which entails a cost factor that can be high.

They require the dismounting of the probe, which can be a lengthy and irksome task since the probe is not always very accessible.

In addition, the recalibration phases dictate the stoppage of the processes in which the pH is used as a control parameter. This leads to a loss of productivity. Thus, in certain water treatment methods, the recalibrations induce a drop in the production of treated water.

4. GOALS OF THE INVENTION

The invention is aimed especially at overcoming the drawbacks of the prior art.

More specifically, it is a goal of the invention to provide a technique for measuring the pH, which enables the reduction, in at least one embodiment, of the frequency of the recalibrations as compared with the techniques of the prior art.

It is another goal of the invention to implement a technique of this kind that makes it possible, in at least one embodiment, to simplify the recalibration operations.

In particular, it is a goal of the invention, in at least one embodiment, to procure a technique of this kind that does not require the dismounting of the probe to carry out its recalibration.

It is another goal of the invention, in at least one embodiment, to procure a technique of this kind that does not call for the probe to be put into contact with various solutions having different known pH values in order to carry out its recalibration.

It is yet another goal of the invention to provide a technique of this kind which, in at least one embodiment, is simple to implement and/or to store and is reliable and/or robust and/or precise.

It is another goal of the invention, in at least one embodiment, to procure a technique of this kind which does not necessitate the use of reagent such as a liquid electrolyte or reagent in the form of gel to carry out the measurement because this gel would have to be renewed during maintenance, as is the case with glass electrodes where the reference electrode bathes in an electrolyte.

5. SUMMARY OF THE INVENTION

These goals as well as others that shall appear here below are achieved by means of device for measuring the pH of an effluent, said device comprising means for measuring a piece of information representing the pH of said effluent, that are to be put into contact with said effluent.

According to the invention, such a device also comprises means for modifying the value of the pH of said effluent in proximity to said means for measuring.

Also according to the invention, such a device in addition preferably comprises means for calibrating said device for measuring, said means for calibrating being configured to calibrate the device for measuring after modification of said pH of said effluent in proximity to said means for measuring by said means for modifying.

Thus, the invention relies on a wholly original approach in which means are integrated, into a pH measurement probe, to modify the pH of the effluent locally, i.e. in proximity to the active part of the probe (elements of the probe in contact with the effluent at the level at which the measurement is made).

It is thus possible to locally modify the value of the pH of the effluent so as to carry out the calibration of the probe without dismounting it or plunging it into different buffer solutions of known pH values in order to calibrate the device.

The technique according to the invention thus makes it possible to carry out an in situ calibration without dismounting the pH probe and therefore facilitates the calibration, reduces the time needed for calibration and reduces its inherent cost.

According to a preferred embodiment, said means for measuring comprise:

an ISFET type transistor comprising a source and a drain disposed on a substrate, and a gate that is to be put into contact with said effluent;

a reference electrode;

means for generating a constant voltage at the terminals of said source and said drain;

second means for generating a constant electric current between said source and said drain;

means for measuring a control voltage $V_{GS}$ at the terminals of said source and said reference electrode, means for determining the value of the pH of said effluent as a function of the value of said control voltage, the value of the control voltage $V_{GS}$ and the value of the pH being preferably related by a formula of the type:

$$V_{GS}=C_2 \cdot pH + E^0,$$

where $E^0$ and $C_2$ are predefined constants;

said means for calibrating being preferably configured to implement phases or steps of calibration during which:

they act on said means for modifying the value of the pH to take it momentarily to at least one first known value $pH_1$, then they act on said means for measuring a control voltage $V_{GS}$, to measure its corresponding value $V_{GS1}$;

they compute the value of the constant $E^0$ according to the values of $pH_1$ and of $V_{GS1}$.

Thus, the invention relies in this embodiment on a wholly original approach in which there is integrated, into a probe for measuring the pH of a type comprising an ISFET transistor, means to locally modify the pH of the effluent and means to calibrate, in situ, the device for measuring.

To measure the pH of a solution, the reference electrode and the gate are put into contact with it.

When the probe is put into contact with the effluent of which it wishes to measure the pH, the H+ ions that it contains modify the electrochemical potential of the solution and therefore the voltage $V_{GS}$ of the ISFET.

Means for generating a constant electric current and a constant voltage are then implemented to generate a constant current and a constant voltage at the terminals of the source and the drain, the values of which are chosen to enable the ISFET transistor to be biased.

The control voltage $V_{GS}$ is then measured at the terminals of the source and the gate or more specifically of the reference electrode. The value of this control voltage varies according to the pH of the effluent. The pH of the effluent is then determined according to the value of the control voltage.

So that the probe does not perceive a drift between the value of pH measured by means of the probe and the real value of the pH, this probe is regularly calibrated in situ. To this end, the means for calibrating preferably act on the means for modifying of the pH to locally carry the value of the pH of the effluent to a known value. They then command the measurement of $V_{GS}$ and then compute the value of $E^0$ which is the intercept point of the curve of the voltage $V_{GS}$ as a function of the pH.

Said means for modifying the value of the pH preferentially comprise an anode and a cathode to be put into contact with said effluent, and first means for generating electric current between said anode and said cathode.

The invention in this case relies on a wholly original approach which consists of the integration, into a pH-measuring probe of the type comprising an ISFET transistor, of an anode and a cathode planned to come into contact with the effluent to be analyzed, and means for generating an electric current at the terminals of this electrodes.

So that the probe does not perceive a drift between the value of pH measured by means of the probe and the real value of the pH, this probe is regularly calibrated in situ. To this end, an electric current is applied between the anode and the cathode. Thus, the production of protons is generated in the effluent in proximity to the measurement means; in the case of an ISFET, at the proximity of the active surface of the gate, by oxidation of water according to the formula $H_2O \rightarrow 2O_2 + 4H^+ + 4e^-$. The pH of the effluent can thus be modified locally in a controlled manner.

Indeed, by regulating the value of the electric current between the anode and the cathode, it is possible to control the value of the pH in proximity to the active part of the measuring means, in the case of an ISFET in proximity to the active surface of the gate. It is thus possible successively to place the pH at one or more different known values in order to calibrate the probe.

The technique according to the invention therefore makes it possible to carry out the calibration of the probe, also called a recalibration, in situ, i.e. without dismounting it and without influencing the medium in which the measurement is made. Indeed, the quantity of $H^+$ ions generated is small as compared with the volume of liquid in which the measurement is made.

The technique of the invention therefore takes part in facilitating the calibration of a pH measuring probe of the type comprising an ISFET transistor and accordingly reducing the cost inherent in this calibration.

Said device, for example said means for modifying the pH, preferably comprises command means to implement or not implement said first means for generating an electric current.

In this case, said means for calibrating are preferably configured to act on said command means to implement said first means for generating an electric current to modify the value of the pH during said phases of calibration.

Thus, it is possible that the first means of current generation will not be implemented to carry out a classic measurement of pH and then could be implemented to locally modify the pH before carrying out new measurements of pH in order to calibrate the device.

According to a preferred characteristic, a device according to the invention comprises a membrane permeable to the $H^+$ ions covering and being in contact with said anode and at least partly said means for measuring, in particular the active part of these means.

When the probe is put into contact with the effluent for which the pH is to be measured, the $H^+$ ions that it contains spread within the membrane in order to reach an equilibrium of concentration between the interior and the exterior of the membrane. The concentration in $H^+$ ions inside the membrane is then identical to that of the effluent. The measurement of the pH is therefore done within the membrane. During the calibration, the pH is modified only within the membrane, i.e. in a restricted volume. In particular, the precision of calibration is improved.

When the device for measuring is of the type comprising an ISFET type transistor, and when it comprises a membrane permeable to $H^+$ ions, this membrane covers said gate and said anode, said gate and said anode being in contact with said membrane.

When the probe is put into contact with the effluent for which the pH is to be measured, the $H^+$ ions that it contains spread within the membrane in order to reach an equilibrium of concentration between the interior and the exterior of the membrane. The concentration in $H^+$ ions inside the membrane is then identical to that of the effluent. A constant electric current and a constant electric voltage of sufficient value are applied between the source and the drain in order to bias the transistor. A control voltage $V_{GS}$ is then measured at the terminals of the reference electrode and the source, the value of which varies as a function of the pH of the effluent. The pH of the effluent is then determined according to the value of the control voltage.

During the calibration, an electric current is applied between the anode and the cathode. Thus, the process generates the production of protons inside the membrane by oxidation of water according to the formula $H_2O \rightarrow 2O_2 + 4H^+ + 4e^-$. The pH of the effluent can thus be modified locally, easily and rapidly in the membrane without interfering with the external medium. The membrane plays the role of a buffer between the external medium and the sensor, the electrodes placed beneath this membrane enabling the pH around the sensor to be modified at will.

Implementing the membrane makes it possible to vary the value of the pH only in the membrane, i.e. in a restricted volume. The value of the voltage between the anode and the cathode generates a constant production of protons within the membrane that is more stable than when the membrane is not used. The reliability of the device and the precision of the calibration are thus improved.

Said membrane is preferably made of polymer such as, for example, poly(2-hydroxyethylmethacrylate).

The use of a polymer and especially of poly(2-hydroxyethylmethacrylate) gives a membrane permeable to the $H^+$ ions, the use of which gives efficient results in terms of control of local variation of pH.

A device according to the invention preferably comprises means to calibrate said device from at least one measurement of said control voltage after an implementation of said first means for generating an electric current by said command means.

In some variants, said reference electrode could include a MOSFET transistor or any other reference pseudo-electrode such as for example a silver-silver chloride wire, gold wire, etc.

The MOSFET transistor fulfils the function of the reference electrode, and the measured control voltage which is proportional to the pH of the solution analyzed, is the voltage at the terminals of the gates of the MOSFET and the ISFET. In this case, the MOSFET is completely encapsulated. Only the gates of the ISFET as well as the anode and the cathode can be put into contact with the effluent to be analyzed.

In the case of the ISFET, the reference electrode will be designed to be put into contact with the effluent to carry out the measurement of the pH.

The invention also relates to a method for measuring the pH of an effluent by means of a device according to any one of the variants described here above.

Such a method comprises:

a phase or step for measuring the pH with said means for measuring;

a step for calibrating comprising, in addition to the previous step, at least one step for modifying the value of the pH of said effluent in proximity to said means for measuring with said means for modifying the value of the of said effluent.

More specifically, such a method preferably comprises:

a phase for measuring the pH with said means for measuring;

a step for calibrating comprising at least one step for modifying said pH of said effluent in proximity to said means for measuring by said means for modifying, and a step for calibrating said device for measuring by said means for calibrating.

According to a first preferred embodiment, said step for measuring the pH comprises:

a step for generating a constant voltage at the terminals of said source et said drain;

a step for generating a constant electric current at the terminals of said source et said drain;

a step for measuring control voltage $V_{GS}$ at the terminals of said source and said reference electrode;

a step for determining the value of said pH as a function of the value of the control voltage $V_{GS}$, the value of the control voltage $V_{GS}$ and the value of the pH being preferably related by the formula of the type: $V_{GS}=C_2 \cdot pH+E^0$, where $E^0$ and $C_2$ are predefined constants.

Said step for calibrating preferably comprises at least:

a step for modifying said pH by said means for modifying the value of the pH to take it momentarily to a first known value $pH_1$, then a step for measuring the corresponding control voltage $V_{GS1}$ by said means for measuring control voltage;

a step of computation by said means for calibrating of said constant $E^0$ as a function of the known values $pH_1$ and $V_{GS1}$.

In this case, the calibration consists in modifying the value of the intercept point of the control voltage $V_{GS}$ expressed as a function of pH.

According to a second embodiment, said step for calibrating comprises a step for modifying said pH by said means for modifying the value of the pH to take it momentarily to a first known value $pH_1$, then a step for measuring the control voltage $V_{GS1}$ by said means for measuring a control voltage $V_{GS}$, to measure the value $V_{GS1}$ corresponding to the first value $pH_1$, then a step for modifying said pH by said means for modifying the value of the pH to take it momentarily to a second known value $pH_1$, a step for measuring the control voltage $V_{GS2}$ by said means for measuring a control voltage $V_{GS}$ to measure the value $V_{GS2}$ corresponding to the second value $pH_2$;

a step of computation by said means for calibrating of the value of said constants $E^0$, $C_2$ as a function of the known values of $pH_1$, $pH_2$, $V_{GS}$, and of $V_{GS2}$.

In this case, the calibration consists in modifying the value of the intercept point $E^0$ and the slope $C_2$ of the control voltage $V_{GS}$ expressed as a function of the pH.

In variants of the invention, said step for calibrating, especially said step for modifying the pH, could include a step for generating a constant electric current between said anode and said cathode.

Said step or steps for modifying said pH could include a step for implementing said first means for generating an electric current.

In variants, said step for calibrating could be implemented at a predetermined frequency, preferably daily. Said step for measuring could be implemented continuously or not continuously. The measurement of the pH will naturally be stopped during the calibration except for the pH measurement needed for the calibration. The frequency of implementation of the calibration could be adjustable.

The invention also concerns an element for measuring the pH of a device according to any one of the variants explained here above. Such a element comprises:

an ISFET type transistor comprising a source and a drain disposed on a substrate, and a gate to be put into contact with said effluent;

a reference electrode;

means for connecting means for generating a constant voltage at the terminals of said source and said drain;

means for connecting second means for generating a constant electric current at the terminals of said source and said drain;

means for connecting means for measuring a control voltage at the terminals of said source and said reference electrode;

an anode;

a cathode;

means for connecting a first means for generating an electric current between said anode and said cathode.

6. LIST OF FIGURES

Other features and advantages of the invention shall appear more clearly from the following description of a preferred embodiment, given by way of a simple, illustratory and non-exhaustive example, and from the appended drawings, of which:

7. DESCRIPTION OF ONE EMBODIMENT OF THE INVENTION

7.1. Reminder of the General Principle of the Invention

The general principle of the invention consists of the integration, into a pH measuring probe, of means for modifying the pH of the effluent locally, i.e. in proximity to the active part of the probe (elements of the probe in contact with the effluent at which the measurement is made).

It is thus possible to locally modify the value of the pH of the effluent so as to carry out the calibration of the probe without dismounting it or plunging it into different buffer solutions having known pH values.

The technique according to the invention thus enables a calibration to be done in situ without dismounting the pH probe and therefore facilitates the calibration, reduces the time needed for the calibration and reduces the cost inherent in this calibration.

In one variant, the invention consists of the integration, into a pH measuring probe of a type comprising an ISFET transistor, of an anode and a cathode to be put into contact with the effluent to be analyzed and of means for generating an electric current at the terminals of the anode and the cathode.

To measure the pH of an effluent, the probe is put into contact with it, a constant voltage $V_{DS}$ is applied to the terminals of the drain and the source and a constant electric current $I_{DS}$ is put into circulation across these terminals in order to bias the transistor. Then, the generation of a voltage $V_{GS}$ is observed at the terminals of the source and the gate, the value of which is proportional to that of the pH of the effluent. This voltage is measured and then the pH of the effluent is determined as a function of the value of voltage measured.

In order to regularly calibrate the probe, an electric current is created between the anode and the cathode. Thus, the production of protons is generated in proximity to the active surface of the gate in order to locally modify the pH of the effluent.

In regulating the value of the electric current across the anode and the cathode, it is possible to control the local value of the pH. It is thus possible to successively place the pH locally at one or more different known values and thus carry out the calibration of the probe.

The technique of the invention therefore plays a part in facilitating the calibration of a pH measuring probe of a type comprising an ISFET transistor and therefore in reducing its inherent cost.

7.2. Example of One Embodiment of a Probe According to the Invention 7.2.1. Architecture Referring to FIG. 2, we present an embodiment of a device for measuring pH according to the invention, also called a pH measuring probe.

Figure 1:
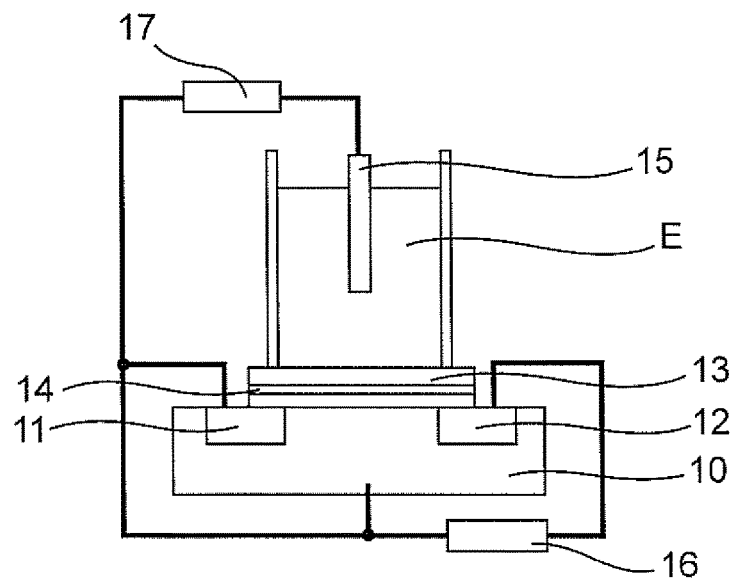
FIG. 1 illustrates a probe for measuring the pH according to the prior art.
Figure 2:
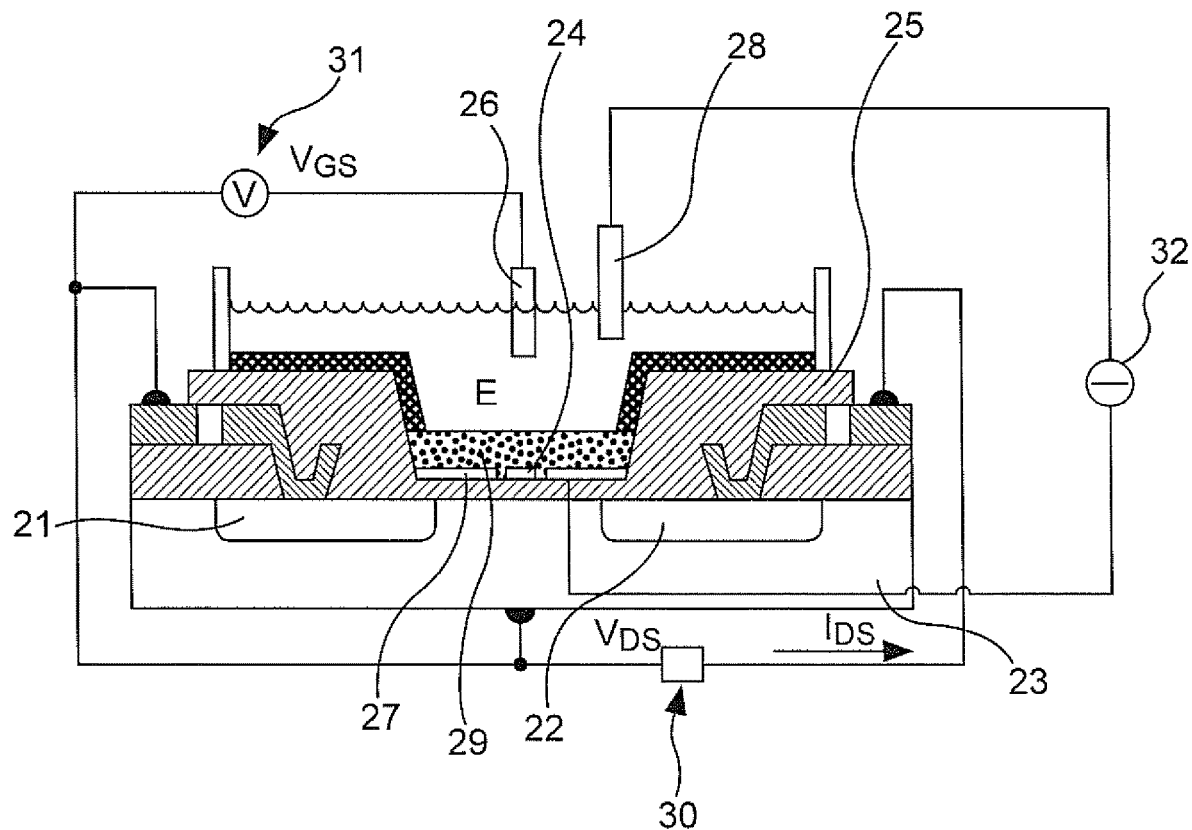
FIG. 2 illustrates a probe for measuring the pH according to the invention.

As shown in this FIG. 2, such a probe comprises an ISFET type transistor. This probe classically comprises a source 21 and a drain 22 placed on a substrate 23. Classically, the drain and the source are doped. Their doping could respectively be N type or P type doping, or vice versa, depending on the type of flow between the source and the drain. It also classically comprises a gate 24. The gate 24 is separated from the source 21 and the drain 23 by an insulator 25 and comprises a surface sensitive to the $H^+$ ions. In this embodiment, the gate is made out of $Ta_2O_5$.

The probe also comprises a reference electrode 26, which is connected with the gate contact of the electronic control circuitry and enables the measurement of the variations in potential at the contact of the gate 24. It also comprises an anode 27 and a cathode 28.

In this embodiment, the anode is made of platinum and the cathode is made of stainless steel. Other suitable materials can also be used.

The anode 27 extends all around the gate 24 without being in contact with it.

The anode 27 as well as the gate 24 are coated with a membrane 29 with which they are in contact. This membrane 29 is permeable to the $H^+$ ions. It is made out of polymer such as for example poly(2-hydroxyethyl methacrylate), agarose, polyvinyl alcohol (PVA), etc. It preferably takes the form of a gel. Its thickness preferably ranges from 40 to 150 microns. It is preferably fixedly attached to the anode and to the gate by covalent bonds.

This membrane 29 as well the reference electrode 26 and the cathode 28 are designed to be put into contact with the effluent E, the pH of which is to be measured.

The probe comprises means 30 for generating a voltage $V_{DS}$, such as a voltage generator, and a current generator $I_{DS}$, such as an electric current generator, which are connected to the terminals of the source 21 and the drain 22 through means for connecting provided for this purpose. These means enable the application of a voltage $V_{DS}$ of constant value and an electric current $I_{DS}$ of constant value between the source and the drain.

The probe comprises means for measuring a voltage $V_{GS}$ between the gate 24 and the source 21 such as for example a voltmeter 31. In this embodiment, these means for measuring are connected to the source and to the reference electrode. They enable the measurement of $V_{GS}$ since the gate and the reference electrodes are both in contact with the effluent to be analyzed.

This voltage varies as a function of the pH of the solution to be analyzed.

The probe comprises means 32 for generating an electric current, such as an electric current generator, that are connected to the terminals of the anode 27 and the cathode 28 through means for connecting provided for this purpose. These means for generating current enable the generation of a constant electric current between the anode and the cathode. This current enables the generation of a fixed concentration of protons proportional to the pH.

The probe comprises a command means for acting on the means 32 for generating current so as to control the intensity of the current that they deliver. The means for generating current can thus generate constant currents of different values for predetermined durations.

The application of an electric current at the terminals of the cathode and the anode by means of the generator 32 enables the generation of the production of $H^+$ protons in the membrane by oxidation of water according to the formula:

$$H_2O => 2O_2 + 4H^+ + 4e-$$

and the modifying of pH therein. The concentration in protons [$H^+$] generated is proportional to the intensity i of the current imposed between the anode and the cathode:

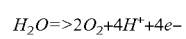

$$[H^+] = C_1 \cdot i$$

where $C_1$ is a constant and i is the intensity of the current imposed between the anode and the cathode.

In general, the value of the constant $C_1$ can be determined during a first step and a second step of initial setting in the factory. The first step consists in carrying out a calibration of the ISFET transistor probe with solutions having known pH values, without generating any current between the anode and the cathode. In another step, different values of current are applied between the anode and the cathode and the corresponding pH is measured by means of the ISFET transistor probe. A characteristic curve linking the value of the measured pH and the generated current is obtained by linear regression. It establishes the value $C_1$ necessary for the in situ calibration, $C_1$ being its slope. The constant $C_1$ is thus determined during the manufacture of the probe.

The probe comprises means for determining the value of the pH of the effluent according to the value of the voltage $V_{GS}$ measured at the terminals of the gate 24 and the source 21.

The function linking the pH to the measured voltage $V_{GS}$ is:

$$V_{GS} = C_2 \cdot pH + E^0$$

where $C_2$ and $E^0$ are constants to be determined.

This formula corresponds to a generalization of the Nernst equation:

$$V_{GS} = (-2.3 RT/nF) \cdot pH + E^0$$

With:
$E^0$: constant
R: constant of gases
F: Faraday constant
T: temperature in degrees Kelvin
n: ion charge The Nernst equation gives the theoretical values of the slope $C_2$ (of the order of 59 mV per pH unit) and of $E^0$ (intercept point which depends on the threshold voltage of the transistor and can vary from one sensor to another). However, $E_0$ and $C_2$ are capable of varying for each ISFET transistor probe. These constants must therefore be determined precisely during the initial calibration at the manufacture of each probe with solutions of known pH values.

In one embodiment, the initial calibration of the probe comprises a first measurement of the voltage $V_{GS}$, called $V_{GS1}$, in a first solution at a first value of pH, $pH_1$, and then a second value of the voltage $V_{GS}$, called $V_{GS2}$, in a second solution at a second value of pH, $pH_2$. The values of the constants $E_0$ and $C_2$ can then be computed by applying the following formulae:

$$C_2 = (pH_1 - pH_2)/(V_{GS1} - V_{GS2})$$

$$E^0 = V_{GS1} - (pH_1 - pH_2)/(V_{GS1} - V_{GS2}) \cdot pH_1$$

The command means and the means for determining the value of the pH comprise a microcontroller.

The probe comprises means for calibrating. These means for calibrating comprise the microcontroller which enables the pH measurement cycles and probe calibration cycles to be carried out in alternation.

The pH curve of the probe is of the $V_{GS} = C_2 \cdot pH + E^0$ type, $C_2$ being the slope and $E^0$ being the intercept point. The values of $E^0$ and $C_2$ vary over time owing to the ageing of the probe.

The in situ calibration is aimed at correcting the intercept point and/or the slope to make sure that the value of pH measured by means of the probe truly reflects reality.

During a calibration cycle, the microcontroller is designed to:
  act on the means for generating current to generate a current of known intensity $I_1$, at the anode and the cathode for an adjustable duration $T_1$ varying from 1 minute to 30 minutes in order to carry the pH within the membrane to a known value $pH_1$;
  act, at the end of the duration $T_1$, on the means for generating current and voltage to generate a constant electric current $I_{DS}$ and a constant electric voltage $V_{DS}$ between the source and the drain in order to bias the transistor;
  activate a measurement in the voltage $V_{GS1}$ between the gate and the source;
  compute the value of intercept point $E^0$ in applying the formula $E^0 = V_{GS1} - C_2 \, pH_1$;
  replace the present value of $E_0$ by the newly computed value.

In this embodiment, the original value of the constant $C_2$ is kept.

In another embodiment of calibration, the microcontroller is designed to:
  act on the means for generating current to generate a first current of a known intensity $I_1$, at the anode and the cathode for an adjustable duration $T_1$ varying from 1 minute to 30 minutes in order to take the pH within the membrane to a first known value $pH_1$;
  act, at the end of the duration $T_1$, on the means for generating current and voltage to generate a constant electric current $I_{DS}$ and a constant electric voltage $V_{DS}$ between the source and the drain in order to bias the transistor;
  activate a measurement of the voltage $V_{GS1}$ between the gate and the source;
  memorize the values of $V_{GS1}$, $pH_1$ and $I_1$;
  act on the means for generating current to generate a second current of a known intensity $I_2$, at the anode and the cathode for an adjustable duration $T_2$ varying from 1 minute to 30 minutes in order to take the pH within the membrane to a known value $pH_2$;
  act, at the end of the duration $T_2$, on the means for generating current and voltage to generate a constant electric current $I_{DS}$ and a constant electric voltage $V_{DS}$ between the source and the drain in order to bias the transistor;
  activate a measurement of the voltage $V_{GS2}$ between the gate and the source;
  memorize the values of $V_{GS2}$, $pH_2$ and $I_2$;
  compute the values of the slope $C_2$ and the intercept point $E^0$ and in applying the formulae:

$$C_2 = (pH_1 - pH_2)/(V_{GS1} - V_{GS2})$$

$$E^0 = V_{GS1} - (pH_1 - pH_2)/(V_{GS1} - V_{GS2}) \cdot pH_1$$

replace the present values of $C_2$ and $E_0$ by the newly computed values.

7.2.2. Operation

A. Measurement of pH

In order to measure the value of the pH of an effluent E, this effluent is put into contact with the reference electrode 26 and with the membrane 29 (hence with the gate and the anode) and with the cathode.

The microcontroller drives the probe so that no current is delivered at the anode and the cathode.

The $H^+$ ions contained by the effluent E then spread inside the membrane 29 so that a equilibrium of concentration is obtained between the interior and the exterior of the membrane 29, i.e. the effluent, for which the measurement is made. The concentration in $H^+$ ions in the membrane 29 is therefore identical to that of the effluent E.

The microcontroller acts on the means for generating electric current and voltage to generate a constant voltage $V_{DS}$ as well as a circulation of a constant electric current $I_{DS}$ between the source 21 and the drain 22. The values of this electric current and this electric voltage will be chosen so that they enable the transistor to be biased.

The generation of a voltage is then observed between the source 21 and the reference electrode 26. This voltage is the voltage $V_{GS}$ of the IFSET transistor between the gate and the source. The value of this voltage $V_{GS}$ is proportional to the value of the pH of the effluent E. This voltage varies linearly as a function of the pH for a constant current $I_{DS}$ and a constant voltage $V_{DS}$. The microcontroller records this voltage $V_{GS}$.

The microcontroller then determines the value of the pH of the effluent E according to the value of the electric voltage $V_{GS}$ measured at the terminals of the source 21 and the gate 24 in applying for example the formula:

$$V_{GS} = C_2 \cdot pH + E^0.$$

B. Calibration

In order to prevent the appearance of a drift between the value of pH measured by means of the probe and the real value of the pH of the effluent, phases of calibration or recalibration of the probe are implemented regularly, preferably daily.

According to a first embodiment, during the calibration cycle, the microcontroller acts on the means for generating current to generate a current of known intensity $I_1$ at the anode and the cathode for an adjustable duration $T_1$ varying from 1 minute to 30 minutes depending on the time needed to put the concentration in $H^+$ ions in equilibrium in the membrane. This duration is parametrized in the factory. This current intensity $I_1$ generates the production of protons for the duration $T_1$ and thus carries the pH in the membrane to a known value $pH_1$. The $H^+$ ions generated are far greater in quantity than the protons present in the effluent (in a log relationship), which makes it possible to overlook the influence of the pH of the water outside the membrane for the calibration.

At the end of the duration $T_1$, the microcontroller acts on the means for generating current and voltage to generate a constant electric current $I_{DS}$ and a constant voltage $V_{DS}$ between the source and the drain: the transistor is then biased.

The microcontroller then activates a measurement of the voltage $V_{GS1}$ between the gate and the source. Then it computes the value of the intercept point $E^0$ in applying the formula $E^0 = V_{GS1} - C_2 \, pH_1$. It then replaces the present value of $E_0$ by the newly computed value in the formula $V_{GS} = C_2 \cdot pH + E^0$.

In another embodiment of calibration, the microcontroller acts on the means for generating current to generate a first current of a known intensity $I_1$ at the anode and the cathode for an adjustable duration $T_1$ varying from 1 minute to 30 minutes depending on the time needed for obtaining equilibrium of concentration of $H^+$ ions in the membrane. This duration is parameterized in the factory. This current intensity $I_1$ generates the production of protons for the duration $T_1$ and thus takes the pH in the membrane to a known value $pH_1$.

At the end of the duration $T_1$, the microcontroller acts on the means for generating current and voltage to generate a constant electric current $I_{DS}$ and a constant electric voltage $V_{DS}$ between the source and the drain: the transistor is then biased.

The microcontroller then activates a measurement of the voltage $V_{GS1}$ between the gate and the source, and memorizes the values of $V_{GS1}$, $pH_1$ and $I_1$.

The microcontroller then again acts on the current generating means to generate a second current of a known intensity $I_2$ at the anode and the cathode for an adjustable duration $T_2$ varying from 1 minute to 30 minutes to take the pH within the membrane to a second known value $pH_2$.

At the end of the duration $T_2$, the microcontroller again acts on the means for generating current and voltage to generate a constant electric current $I_{DS}$ and a constant electric voltage $V_{DS}$ between the source and the drain in order to bias the transistor.

The microcontroller then activates a measurement of the voltage $V_{GS2}$ between the gate and the source, and memorizes the values of $V_{GS2}$, $pH_2$ and $I_2$.

The microcontroller then computes the values of the slope $C_2$ and of the intercept point $E^0$ in applying the formulae:

$$C_2 = (pH_1 - pH_2)/(V_{GS1} - V_{GS2})$$

$$E^0 = V_{GS1} - (pH_1 - pH_2)/(V_{GS1} - V_{GS2}) \cdot pH_1$$

It finally replaces the present values of $C_2$ and $E^0$ by the newly computed values in the formula $V_{GS} = C_2 \cdot pH + E^0$.

7.3. Trials

Trials were performed to verify the efficiency of a probe according to the invention.

These trials consisted in measuring the value of the pH of an effluent with a classic glass electrode probe and then with a probe according to the invention.

Figure 3:
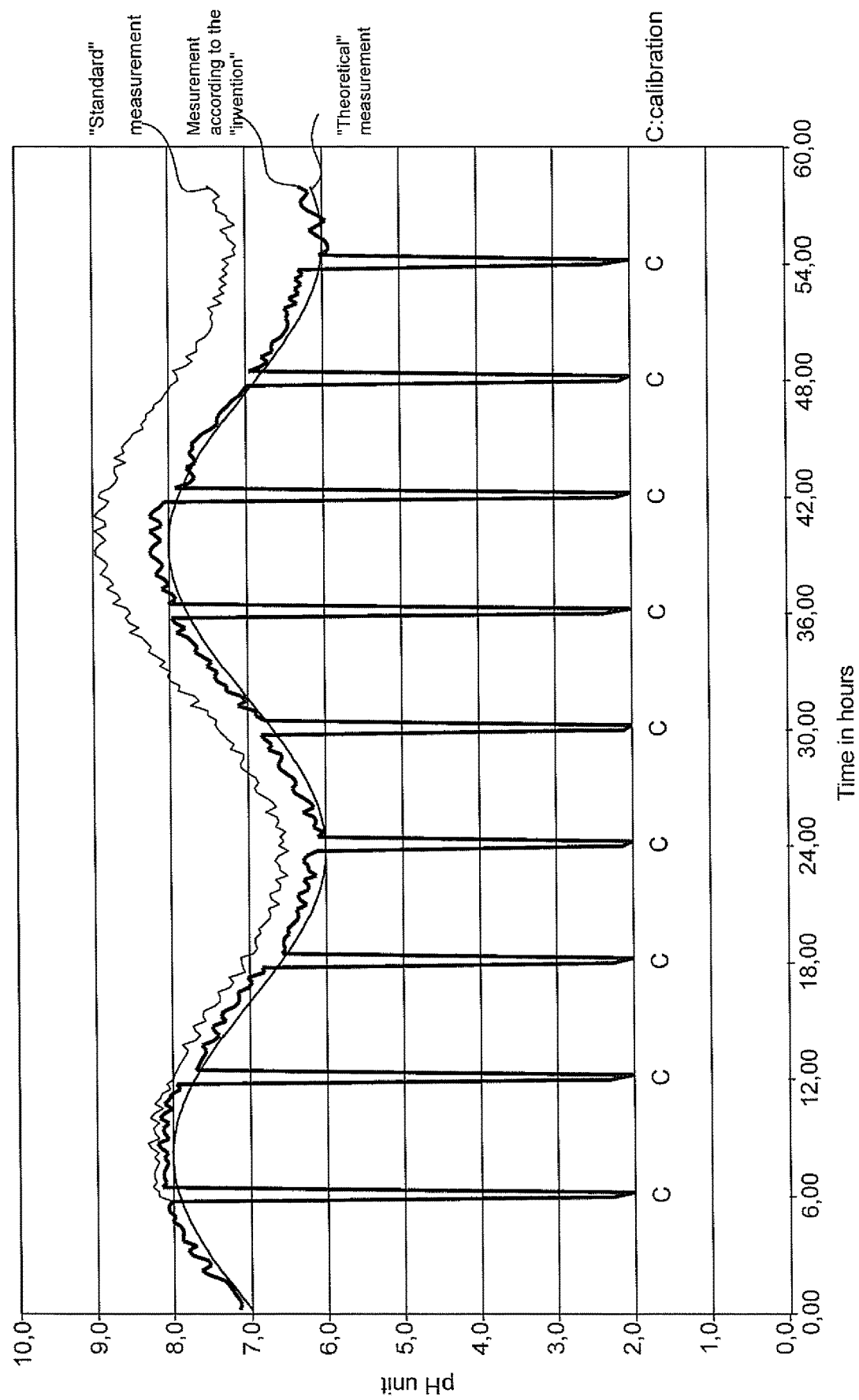
FIGS. 3 and 4 illustrate curves showing the evolution in time of the real value of the pH of a solution, the value of the pH measured by means of a probe according to the prior art, and the value of the pH measured by means of a probe according to the invention.
Figure 4:
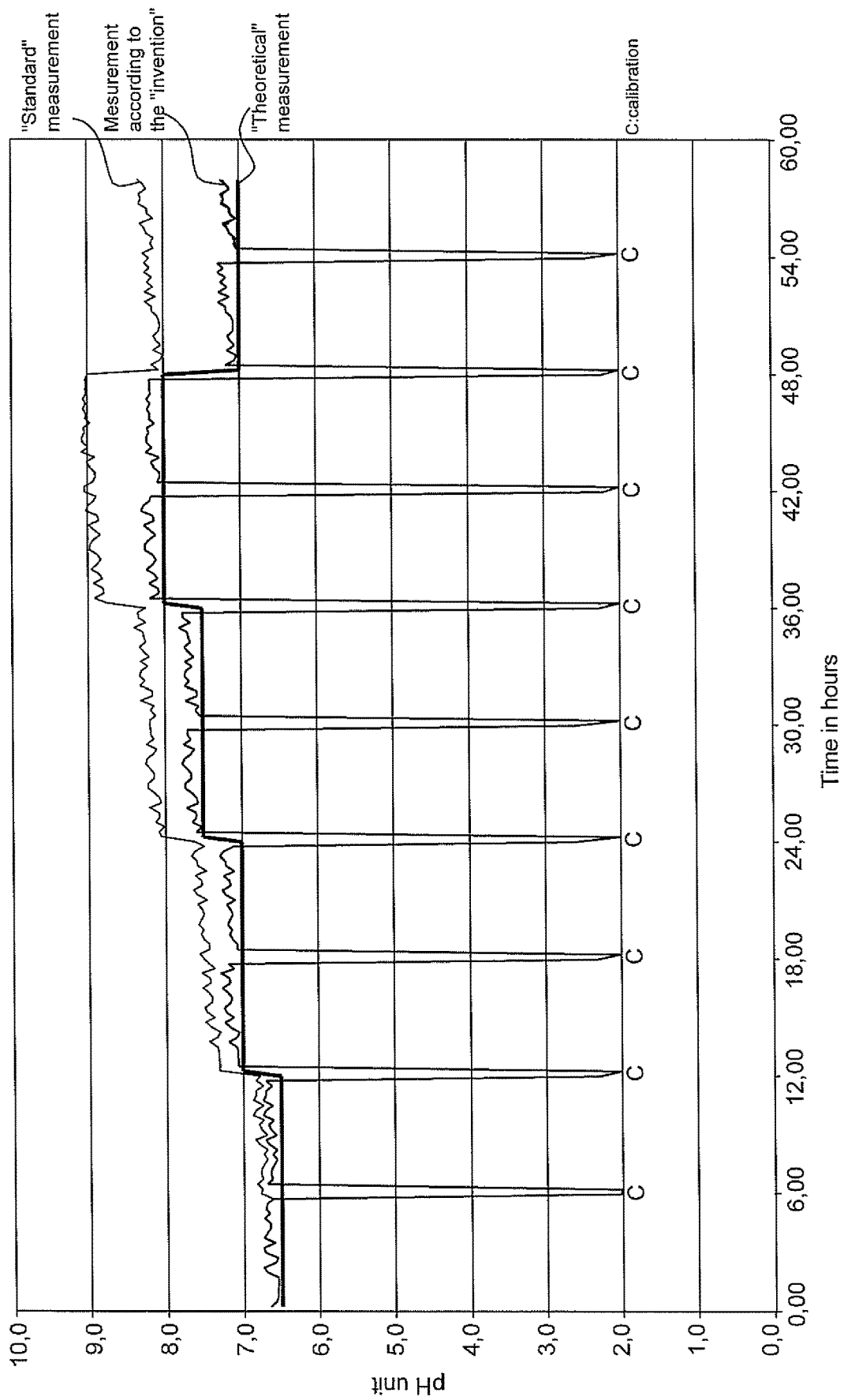

FIGS. 3 and 4 illustrate:
the real variation of the pH of an effluent: theoretical value;
the variation of the pH value measured by means of a probe according to the prior art: standard measurements;
the variation of the pH value measured by means of a probe according to the invention: measurements according to the invention.

As can be seen in these figures, in conducting a calibration step every six hours, the drift between the real value of the pH and the value of the pH measured by means of a probe according to the invention is almost zero or at least appreciably smaller than the drift observed between the real value of the pH and the value of the pH measured by a prior-art probe.

7.4. Variant

In one variant, it can be that the membrane will not be implemented. In this case, the generation of the current at the anode and the cathode will modify the value of the pH of the effluent in a controlled manner in proximity to the gate. In other respects, the structure and the operation of the probe according to this variant are identical to those of the probe comprising the membrane.

In one variant, the reference electrode of the probe could be replaced by a MOSFET (Metal/Oxide/Semi-conductor Field Effect Transistor) type transistor. In this case, the gate of the MOSFET is electrically connected to the gate of the ISFET and a constant current and voltage are applied between the source and the drain of the MOSFET to bias it. The measurement of the voltage at the terminals of the gate of the MOSFET and that of the ISFET which is proportional to the pH of the solution to be analyzed makes it possible to deduce the pH from this.

In other variants, the reference electrode could be constituted by a reference pseudo-electrode made of silver-silver chloride wire, gold wire or other types of wire.

Figure 5:
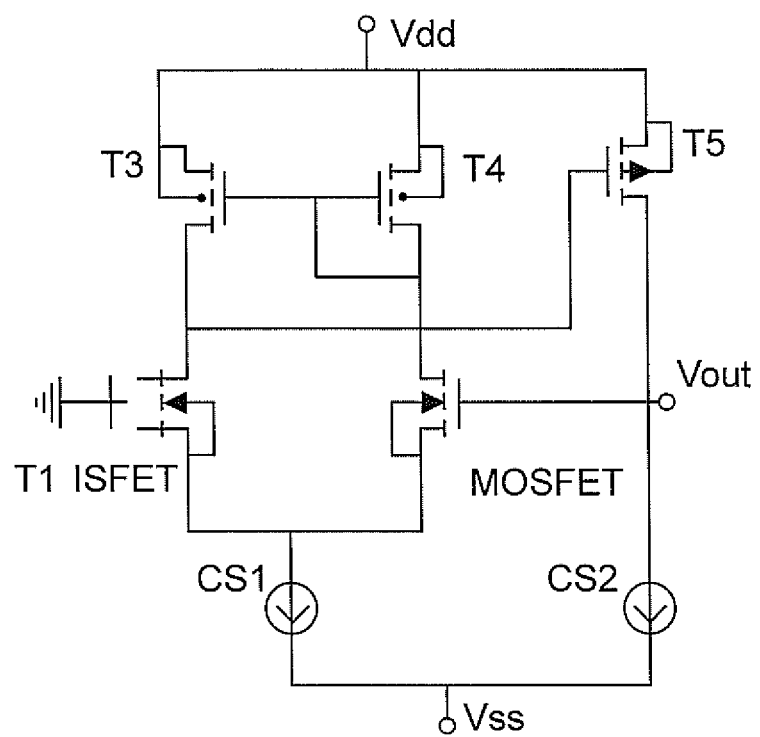
FIG. 5 illustrates the diagram of a part of an electric circuit of a probe according to the invention, the reference electrode of which is constituted by a MOSFET transistor.

FIG. 5 illustrates an example of an electronic connection diagram of the MOSFET and ISFET transistors of a probe according to this variant.

In this example, a differential cascade is implemented. This cascade contains a transistor T5 in a feedback connection. The transistors T3 and T4 are the active load of the MOSFET and of the ISFET which ensures the equality of the drain in these two transistors. The transistor T5 (identical to T3 and T4) drives the gate voltage of the MOSFET. The type of conductivity of the channel of the transistors T3, T4 and T5 is opposite that of the ISFET and the MOSFET. To ensure the equality of the drain-source voltages $V_{DS}$ of the MOSFET and the ISFET, the condition $I_{CS2} = 0.5 \cdot I_{CS1}$ is needed.

Thus, if the potential of the gate $V_{G1}$ of the ISFET increases, the potential on the source $V_{S1}$ must increase since the drain-source current $I_{DS1}$ and the potential at the drain $V_{D1}$ are fixed by all the transistors T3, T4, T5. Identically, the increase in potential at the source ($V_{S1}=V_{S2}$) will lead to an increase in potential at the gate $V_{G2}$ of the MOSFET and therefore of the output voltage $V_{out}$. The potential is measured relatively to the ground of the circuit. It corresponds to the voltage between the gates of the MOSFET and the ISFET which is proportional to the pH of the solution.

In this embodiment, only the anode and the gate of the ISFET are put into contact with the effluent to be analyzed.

The invention claimed is:

1. A method of performing calibrated measurements of the pH of an effluent using a non-glass electrode probe, comprising:
   placing the probe in contact with the effluent;
   repeatedly obtaining measurements of the pH of the effluent by, for each measurement,
      biasing an ISFET transistor by applying a constant voltage and current across source and drain terminals of the ISFET, a gate terminal of which is insulated from the source and drain terminals and in contact with the effluent and hence at the same voltage as a non-glass reference electrode in contact with the effluent;
      measuring a voltage $V_{GS}$ between the non-glass reference electrode and the ISFET source terminal;
      determining the pH of the effluent from $V_{GS}$ and a calibration curve expressing $V_{GS}$ as a function of the pH of the effluent; and
   periodically, while obtaining measurements of the effluent pH, performing an in situ calibration of the probe, by modifying the pH of the effluent in the vicinity of the ISFET gate terminal and non-glass reference electrode to a first known value $pH_1$ by regulating the value of electric current between an anode and a cathode, wherein the pH is known by a first and second step of initial setting during probe manufacture, the first and second steps comprising:
      1) Carrying out a calibration of the ISFET transistor probe with solutions having known pH value, without generating any current between the anode and the cathode, and
      2) Different values of current are applied between the anode and the cathode and the corresponding pH is measured by means of the ISFET transistor probe, so that a characteristic curve linking the value of the measured pH and the current between the anode and the cathode is obtained by linear regression, and;
   obtaining a corresponding value $V_{GS1}$ by performing the biasing and measuring steps on the effluent at the known $pH_1$; and
   calibrating the probe by modifying an intercept point $E_0$ in the calibration curve, using the values $V_{GS1}$ and $pH_1$.

2. The method of claim 1 wherein the calibration curve is of the form $V_{GS}=C_2 \cdot pH+E_0$, where $V_{GS}$ is the gate-source voltage of the ISFET obtained in the measuring step;
$C_2$ is a predetermined value representing the slope of the curve;
pH is the pH of the effluent; and
$E_0$ is a predetermined value representing the intercept point of the curve.

3. The method of claim 2 wherein the predetermined values $C_2$ and $E_0$ are determined at manufacture by calibration using solutions of known pH.

4. The method of claim 2 wherein modifying an intercept point $E_0$ in the calibration curve, using the values $V_{GS1}$ and $pH_1$ comprises applying the formula:

$E_0=V_{GS1}-C_2 \cdot pH_1$.

5. The method of claim 2 wherein performing an in situ calibration of the probe further comprises:
   modifying the pH of the effluent in the vicinity of the ISFET gate terminal and non-glass reference electrode to a second known value $pH_2$;
   obtaining a corresponding value $V_{GS2}$ by performing the biasing and measuring steps on the effluent at the known $pH_2$; and
   calibrating the probe by modifying both the intercept point $E_0$ and a slope value $C_2$ in the calibration curve, using the values $V_{GS1}$, $V_{GS2}$, $pH_1$, and $pH_2$.

6. The method of claim 1 wherein modifying the pH of the effluent in the vicinity of the ISFET gate terminal and non-glass reference electrode comprises applying a constant current $I_1$ between an anode surrounding, but not touching, the ISFET gate terminal, and a cathode comprising an electrode disposed in the effluent, for an adjustable duration $T_1$.

7. The method of claim 6 wherein the adjustable duration $T_1$ varies from 1 to 30 minutes.

* * * * *